(12) United States Patent
Yoshida

(10) Patent No.: US 7,365,458 B2
(45) Date of Patent: Apr. 29, 2008

(54) BRUSHLESS DC MOTOR WITH MOLDED RESIN HOUSING

(75) Inventor: Hiroshi Yoshida, Obama (JP)

(73) Assignee: Nidec Shibaura Corporation, Fukui (JP)

( * ) Notice: Subject to any disclaimer, the term of this patent is extended or adjusted under 35 U.S.C. 154(b) by 239 days.

(21) Appl. No.: 11/377,490

(22) Filed: Mar. 16, 2006

(65) Prior Publication Data

US 2006/0220474 A1 Oct. 5, 2006

Related U.S. Application Data

(63) Continuation-in-part of application No. 10/907,401, filed on Mar. 31, 2005, now abandoned.

(51) Int. Cl.
*H02K 7/00* (2006.01)

(52) U.S. Cl. .................. 310/68 R; 310/71; 310/90

(58) Field of Classification Search .............. 310/43, 310/68 R, 89–90, 71–72
See application file for complete search history.

(56) References Cited

U.S. PATENT DOCUMENTS

| | | | |
|---|---|---|---|
| 3,159,354 A | 12/1964 | Yortz et al. | |
| 3,500,084 A | 3/1970 | Seiichi et al. | |
| 3,874,073 A | 4/1975 | Dochterman et al. | |
| 4,515,417 A | 5/1985 | Shiraishi | |
| 5,821,652 A * | 10/1998 | Hyypio | 310/83 |
| 6,359,354 B1 | 3/2002 | Watamabe et al. | |
| 6,617,721 B1 | 9/2003 | Neal | |
| 6,819,018 B2 * | 11/2004 | Melfi | 310/68 R |
| 7,071,589 B2 * | 7/2006 | Bramel et al. | 310/90 |
| 2003/0117095 A1 | 6/2003 | Gorti | |
| 2004/0056543 A1 * | 3/2004 | Melfi | 310/68 R |
| 2004/0256933 A1 | 12/2004 | Toyokawa et al. | |
| 2005/0285464 A1 * | 12/2005 | Orders et al. | 310/88 |
| 2006/0186746 A1 * | 8/2006 | Nanbu et al. | 310/68 R |

* cited by examiner

*Primary Examiner*—Thanh Lam
(74) *Attorney, Agent, or Firm*—Konomi Takeshita

(57) ABSTRACT

An invention is provided wherein the bearings of a molded motor do not become electro-eroded. An inner rotor type, brushless DC motor 10 is provided having a stator 22 which has a stator core 12 wound with a coil 16, a housing 26 formed by covering the outside surfaces of the motor 10 with an unsaturated polyester, molding resin having electrical insulating properties, and an earth electrode 40 made of metal, installed to go through a metal bracket 38 and the housing 26 to reach the stator core 12, such that electric current flows from the stator core 12 and the bracket 38 to the exterior, preventing electro-erosion and resulting deterioration of bearings 30, 32.

4 Claims, 1 Drawing Sheet

BRUSHLESS DC MOTOR WITH MOLDED RESIN HOUSING

CROSS-REFERENCE TO RELATED APPLICATIONS

This application is a continuation-in-part application, based on U.S. Nonprovisional Application Ser. No. 10/907,401, entitled "Brushless DC Motor With Molded Resin Housing" and filed on Mar. 31, 2005 now abandoned, the disclosure of which is incorporated by reference.

FIELD OF THE INVENTION

This invention relates to a molded motor, having its outside surfaces covered by a molding resin.

BACKGROUND OF THE INVENTION

Conventionally, there exists a molded motor, having a housing mold formed on a stator using a molding resin, in which a stator core is wound with a coil, and inside of which a rotor is held by a bearing.

Regarding the aforementioned molded motor, because the aforementioned molded motor has its outside surfaces covered with a molding resin that is an insulator, and also, because it is typically employed at lower voltages, there has conventionally not been much need for considering a grounding issue.

However, such a need arises in the case of a molded motor for operation at high voltages and PWM (PULSE WIDTH MODULATION) control. Due to the distribution of capacitance elements resulting from the structure of the motor, as well as the voltage variance (dv/dt) from the PWM, electricity charges the stator, and this electricity flows to the rotor from the stator, via the bearings. Thus, the resulting electro-erosion deteriorates or possibly breaks down the bearings.

For instance, as shown in FIG. 2, in the molded motor 100 for high voltages and PWM (PULSE WIDTH MODULATION) control, wherein an insulating, unsaturated polyester is used as the molding resin, electric current generated due to the aforementioned reason (shown by the dotted arrows in FIG. 2), goes through the stator core 102, the stator coil 104, the bearings 106, the rotary axis 108, and the rotor 110, and returns to the stator core 102. In this manner, electricity passes through the bearings 106, and the resultant electro-erosion deteriorates them or possibly breaks them down.

In consideration of the above-mentioned problem, the present invention offers a brushless direct current (DC) motor where the bearings do not experience electro-erosion. The present invention provides such a motor, covered by a molding resin, where an electric current does not flow from the stator to the bearings 106.

SUMMARY OF THE INVENTION

An inner rotor type, brushless DC motor having a stator having a stator core wound with a coil; a housing, having a bottom, formed by covering the stator with a molding resin comprising an electrically insulating, unsaturated polyester; a circular-shaped metal bracket covering an opening portion of the housing and arranged at a side portion of the housing; a rotor held to be freely rotatable by a pair of bearings inserted on a rotary axis for the rotor, wherein at least one of the bearings is fixed by the bracket at a central portion of the bracket; an earth electrode made of metal, having a first end going through the housing and abutting at the stator core, and a second end contacting the bracket, and an earth cord installed at the bracket and the earth electrode, wherein while the motor is controlled by PWM (PULSE WIDTH MODULATION) control and operates at a high voltage, an electric current occurs in the stator core and moves to the metal bracket through the earth electrode and flows to ground via the earth cord, thereby preventing a current flow, through the pair of bearings, from the stator core to the rotary axis having a relatively lower voltage.

DETAILED DESCRIPTION OF THE INVENTION

Figure 1:
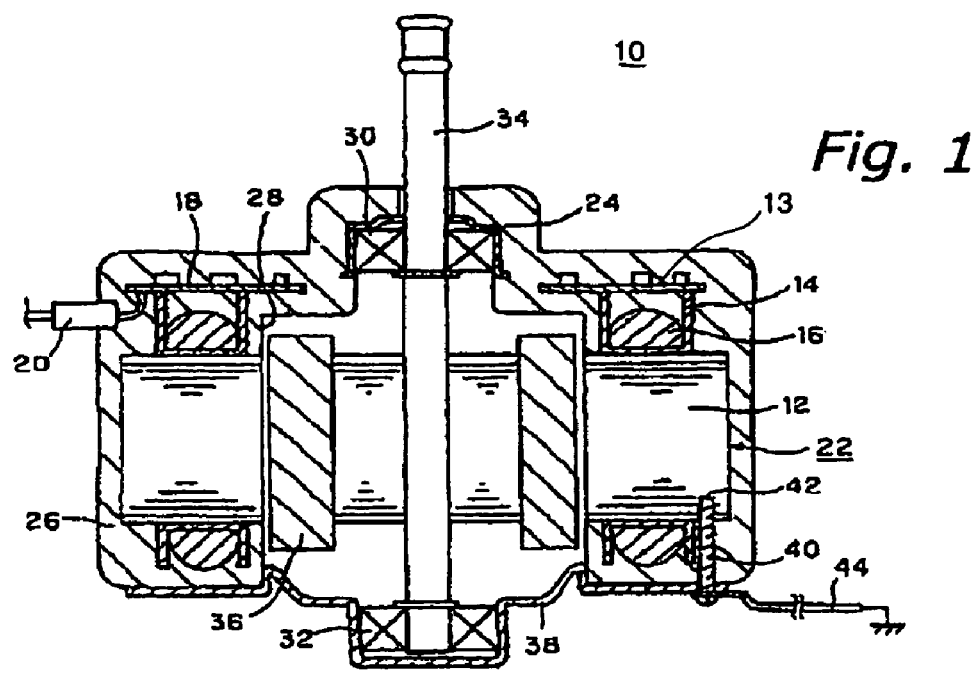
FIG. 1 is a longitudinal cross-sectional view of the molded motor 10 of the present invention.
Figure 2:
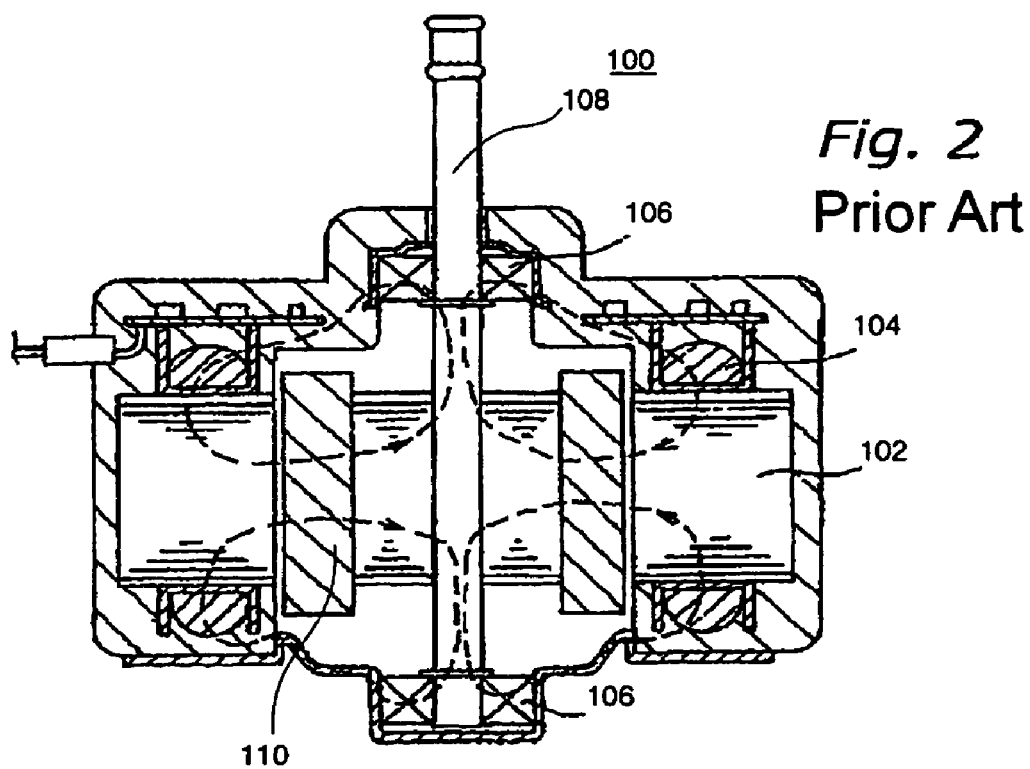
FIG. 2 is a longitudinal cross-sectional view of a conventional molded motor.

One embodiment of the present invention is explained below referring to FIG. 1. FIG. 1 is a longitudinal cross-sectional view of the molded motor 10 of the present embodiment.

For this molded motor 10, which is covered by an insulating resin, a pre-mold is applied to a cylindrical stator core 12 of layered steel plates to form a pre-mold part 13, which also serves as an insulating layer. Then, a coil 16 is wound on a projecting part 14 formed on the pre-mold part 13.

A control board 18, on which the driving circuit of the molded motor 10 is mounted, is installed at one side of this stator core 12 (an upper part as shown in FIG. 1). In this case, the board 18 is secured by insertably placing an aperture prepared on the board to engage with a portion of the pre-mold part 13.

A connector 20 for sending out signals is installed at this control board 18.

The stator 22 for which the stator coil 16 is wound on the stator core 12, the control board 18 and connector 20, as mentioned above, and a separate bracket 24 made of metal and installed at an upper portion of the motor 10, are placed in a resin-forming metal mold. Then they are mold formed into an integral housing 26 using a molding resin. In this case, for example, an unsaturated polyester having electrical insulating properties can be used as the molding resin.

In the cylindrical housing space 28 of the housing 26 formed as described above, a rotor 36 is housed to be freely rotatable. Bearings 30 and 32 are installed at the upper and lower parts, respectively, of the rotary axis 34 of the rotor 36. In this case, the bearing 30 should be fixed by the bracket 24.

After the rotor 36 is housed in the housing space 28, the other side of a plate shaped metal bracket 38 is fixed to be engaged with an underside of the housing. Bearing 32 is also inserted into a concavity formed at a central part of the bracket 38.

Then, an earth electrode 40, made of metal, goes from an outer circumference of the metal bracket 38 through the housing 26 to engage with the stator core 12. In this case, a through hole with which the earth electrode 40 can be engaged, may be formed beforehand, at the time of mold forming. A hole 42 can also be simultaneously formed on the stator core 12, that corresponds to that location. Furthermore, the molding resin forming may be performed in this condition where the earth electrode 40 has already been fixed to the stator core 12.

An earth cord 44 is installed between the earth electrode 40 and the bracket 38 for connecting to the exterior. Furthermore, this earth electrode 40 and the ground (ground potential) of the control board 18 should not be connected electrically In the molded motor 10 as structured above, if it is rotated by a driving circuit provided at the control board 18, using PWM (PULSE WIDTH MODULATION) control, an electric current may occur at the stator, due to either the distribution of capacitance elements resulting from the motor structure, or to the dv/dt of the PWM (PULSE WIDTH MODULATION) control.

As described above, the present invention involves a brushless DC motor, over-molded or encapsulated by an insulating molding resin. This resin housing has a "bottom" and an opening covered by a metal bracket. Conventionally, with such an electrically insulated structure, such a current cannot escape to the outside. Rather, it would flow to the lower voltage rotary axis 34, through the bearings 30, 32, thereby causing the above-mentioned electro-erosion.

However, with the above-described arrangement of the present invention, such electric current flows to the exterior of the motor, by way of the earth electrode 40, which contacts the stator core 12, and the earth cord 44.

Additionally, in this case, since the earth electrode 40 is also connected electrically to the metal bracket 38, the electric current from the charging of the metal bracket 38 also flows outside via the earth cord 44. As a result, the passage of electric current through bearings 30 and 32, as in the conventional art, does not occur. Thus, one can avoid deterioration or possible break downs of the bearings, due to the resultant electro-erosion. In this manner, such conventional problems can be prevented, even for molded motors using PWM control, which are particularly erosion-prone.

As stated above, in a brushless DC motor covered by an insulating molding resin, one end of the earth electrode 40 is installed at the stator core, and the other end is installed at the metal bracket 38. Thus, even if the dv/dt from the PWM (PULSE WIDTH MODULATION) control and/or distribution of capacitance elements due to the structure of the motor causes the resulting electric current to charge the stator, the above-described deterioration or damage to the bearings 30 and 32 will not occur. Instead, the electricity flows out from the stator core 12 to the motor's exterior via the earth electrode 40 and the earth cord 44, thereby avoiding electro-erosion of the bearings 30 and 32.

Even when the mold resin is an electrically insulating, unsaturated polyester, which prevents escape of the electrical current at the stator core, it is possible with the above arrangement, to prevent the electro-erosion of the bearings.

Also, if the earth electrode has the form of a metal screw, it can easily be installed on the stator core. Furthermore, it is possible to substitute a pin or a shaft for the screw.

Alternative 1

The aforementioned embodiment is described using a brushless DC motor as the molded motor 10 but other types of motors can also be employed.

Alternative 2

The aforementioned embodiment is described using a molded motor 10 in which the control board 18 is built in, but the control board 18 can also be installed outside of the housing 26, and a motor type where it is not built into the housing 26 can also offer a similar effectiveness as the above mentioned embodiment.

What is claimed is:

1. An inner rotor type, brushless DC motor comprising:
   a stator having a stator core wound with a coil;
   a housing, having a bottom, formed by covering said stator with a molding resin comprising an electrically insulating, unsaturated polyester;
   a circular-shaped metal bracket covering an opening portion of said housing and arranged at a side portion of said housing;
   a rotor held to be freely rotatable by a pair of bearings inserted on a rotary axis for said rotor, wherein at least one of said bearings is fixed by said bracket at a central portion of said bracket;
   an earth electrode made of metal, having a first end going through said housing and abutting at said stator core, and a second end contacting said bracket, and
   an earth cord installed at said bracket and said earth electrode,
   wherein while said motor is controlled by PWM (PULSE WIDTH MODULATION) control and operates at a high voltage, an electric current occurs in said stator core and moves to said metal bracket through said earth electrode and flows to ground via said earth cord, thereby preventing a current flow, through said pair of bearings, from said stator core to said rotary axis having a relatively lower voltage.

2. The brushless DC motor of claim 1, wherein said earth electrode is a metal screw.

3. The brushless DC motor of claim 1, wherein said earth electrode is a metal pin.

4. The brushless DC motor of claim 1, further comprising a driving circuit on a control board, installed at said motor, for driving said motor using PWM control.

* * * * *